Aug. 3, 1954      J. E. WOODS      2,685,305
CORRUGATED TUBE AND BELLOWS
Filed Aug. 30, 1950
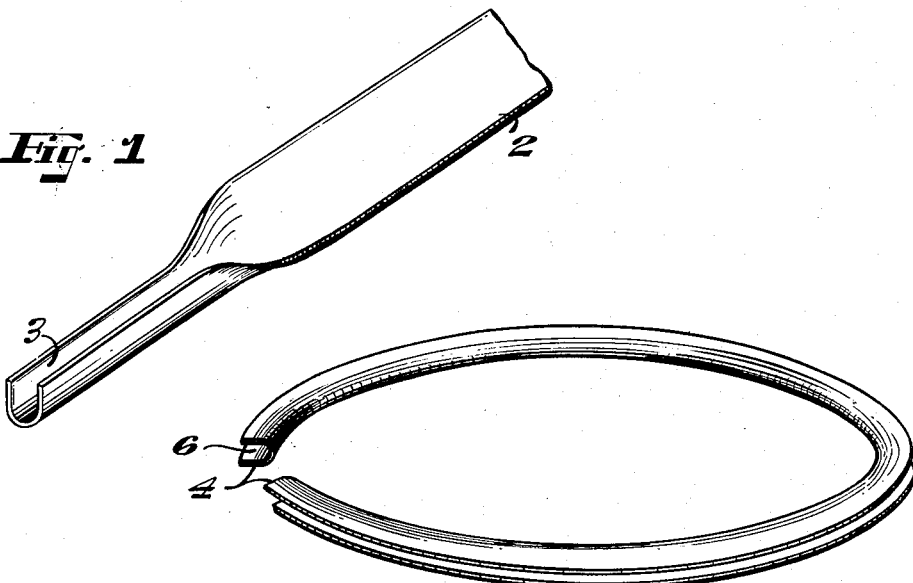
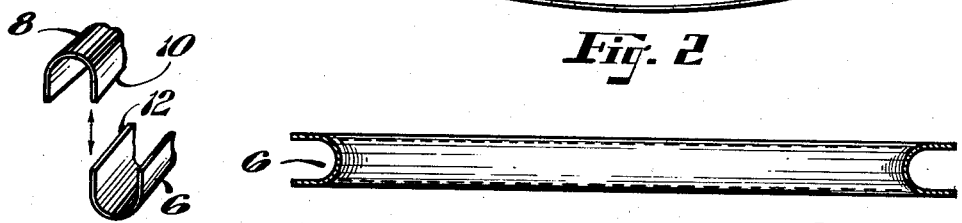
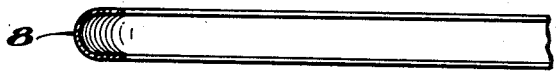
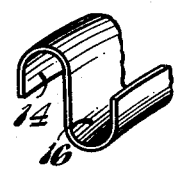
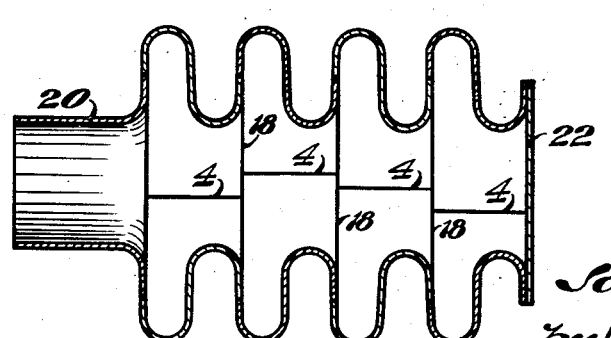

Patented Aug. 3, 1954

2,685,305

UNITED STATES PATENT OFFICE 2,685,305

CORRUGATED TUBE AND BELLOWS

John E. Woods, Cohasset, Mass., assignor to Standard - Thomson Corporation, Waltham, Mass., a corporation of Delaware Application August 30, 1950, Serial No. 182,185

5 Claims. (Cl. 138—50)

The present invention relates to the manufacture of corrugated tubes and bellows.

Corrugated tubing as used for bellows, expansion joints and the like is made generally by one of three methods: (1) mechanical rolling of tubing, (2) hydraulic formation, and (3) by the use of built-up members which are soldered or welded together. For the manufacture of very large tubes, which may run up to several feet in diameter, the hydraulic method is commercially impracticable because of the investment in dies. The method of making bellows by rolling previously manufactured tubing is expensive and also is not satisfactory when units of considerable flexibility are required. The usual built-up bellows or corrugated tubing is formed from a series of annular disks, which are welded together at the inner and outer edges. This construction has the disadvantage that the welded joints are at the points of maximum stress, and hence the bellows have non-uniform flexibility and their life is also materially reduced. Further, in the very large sizes the individual disks are necessarily made up as segments which are welded together. This construction increases the number of joints and hence increases the cost of manufacture and also reduces the flexibility and life of the bellows.

The object of the present invention is to provide a relatively simple and inexpensively manufactured type of bellows or corrugated tubing in which the joints are relatively few in number and are at places of minimum rather than maximum stress. To this end the present invention contemplates the manufacture of bellows by forming strip stock into a simple channel form, curving the channel into a circle which is welded or otherwise suitably secured and then building up the bellows from a number of such channels which are suitably welded together along lines at which minimum stresses occur in the normal operations of the bellows.

In the accompanying drawings, Figs. 1 and 2 are perspective views illustrating the method of making the bellows; Fig. 3 is a perspective view illustrating the connection of two sections; Figs. 4 and 5 are views showing the inner and outer sections; Fig. 6 is a view illustrating a single convolution made according to a modified form of the invention; and Fig. 7 is an elevation of the completed corrugated tube.

As shown in Fig. 1, a piece of strip stock 2 is first formed into a long straight channel 3 by suitable means, as by rolling. This channel is then curved into a circle as shown in Figs. 2 and 4 and the ends 4 are butt welded to form an annular member 6 having an outwardly facing channel. The part thus formed may be considered as the "inner" section of a single fold of the corrugated tubing. An "outer" section 8 is formed in substantially identical fashion except that, as shown in Fig. 5, the channel faces inwardly. The inner and outer portions are brought together and welded along lines 10 and 12. This welding may be readily accomplished since access for the welding tool is adequate. This weld may be either a butt weld or lap weld, but is shown as a simple butt weld in Fig. 3.

In a modified, and in some respects preferable, form, both the inner and outer sections of a single convolution are made from one piece of strip stock, as shown in Fig. 6. In this form, the original strip is formed with reverse channels 14 and 16 and when the channel member is curved into a circle the ends are butt welded as in the case of Figs. 4 and 5. The convolution of Fig. 6 is identical in all respects with that formed of the two sections in Fig. 3, except that there is no intermediate weld line.

The convolutions, whether formed as in Fig. 3 or as in Fig. 6, are then secured together by welding to produce the complete member shown in Fig. 7. In Fig. 7 the butt welds at the ends 4 of the rings are indicated. These are preferably staggered so that the welds of adjacent convolutions do not come together. The circumferential welds are indicated at 18 and as heretofore noted, may be either butt welds or lap welds, preferably the former. As shown in Fig. 7 there is only one weld 18 for each whole convolution; in other words, this involves the construction of Fig. 6. If the construction of Fig. 3 were used, there would be additional circumferential welds 18 between the inner and outer sections of each convolution.

The ends may be completed as desired, as for example, by the application of a tube 20 at one end and a closure plate 22 at the other, both suitably welded to the end convolutions. The cross-sectional shapes of the convolutions, as shown in the drawings, are typical but are not essential, and may be varied as desired.

The principal feature of the invention is that the welds 18 occur along lines of minimum stress. They are at the places where the curvature of the convolution changes; in other words they are at places of zero curvature. Under expansion or contraction of the corrugated member, there is no change of curvature at these points and hence no more than minimum bending stress.

This is to be distinguished from built-up bellows and diaphragms of conventional form, wherein the welds are at the tips and roots of the convolutions, which are points of maximum stress.

Although the invention has been described as applied to the manufacture of large bellows, it is also adaptable to the smaller sizes, since access for the welding equipment is greater than in any conventional built-up forms. Furthermore, for certain materials such as stainless steel and other high duty alloys the bellows formed according to the present invention, even in the small sizes, are superior to those obtained by mechanical rolling methods, since the severe tensions and stretchings of the metal in the rolling method result in localized cold working, which is undesirable in any bellows intended for a large number of expansions and contractions.

Having thus described the invention, I claim:

1. A corrugated tube for a bellows or the like comprising convolutions of generally annular contour, each convolution comprising an inner outwardly facing channel-like section and an outer inwardly facing channel-like section, said convolutions being formed of strips of stock, each strip having its ends welded together to form an annular member, and the successive convolutions being welded to one another in the side walls of the convolutions and along circumferential lines where the curvature of an outwardly facing channel section changes to the curvature of an inwardly facing channel section.

2. A corrugated tube for a bellows or the like comprising convolutions of generally annular contour, each convolution comprising an inner outwardly facing channel-like section and an outer inwardly facing channel-like section, said convolutions being formed of strips of stock, each strip having its ends welded together to form an annular member, the successive convolutions being welded to one another in the side walls of the convolutions and along circumferential lines where the curvature of an outwardly facing channel section changes to the curvature of an inwardly facing channel section, and the end welds of said strips in adjacent convolutions being staggered.

3. A corrugated tube for a bellows or the like comprising convolutions of generally annular contour, each convolution comprising an inner outwardly facing channel-like section and an outer inwardly facing channel-like section, each section being formed of a strip of stock with its ends welded together to form an annular member, the sections of each convolution and the successive convolutions being welded to one another in the side walls of the convolutions and along circumferential lines where the curvature of an outwardly facing channel section changes to the curvature of an inwardly facing channel section.

4. A corrugated tube for a bellows or the like comprising convolutions of generally annular contour, each convolution comprising an inner outwardly facing channel-like section and an outer inwardly facing channel-like section and being formed of a strip of stock with its ends welded together to form an annular member, the successive convolutions being welded to one another in the side walls of the convolutions and along circumferential lines where the curvature of an outwardly facing channel section changes to the curvature of an inwardly facing channel section.

5. A method of making corrugated metal tubing which in normal use is subjected to longitudinal expansion and contraction, such method comprising curving strips of stock transversely to provide channels having side walls, curving said strips longitudinally to form generally annular members and to provide inner sections having outwardly facing channels and outer section of greater diameter than said inner section and having inwardly facing channels, welding together the ends of each strip, assembling said members in axially aligned relationship with a side wall of an outwardly facing channel of one member engaging a side wall of inwardly facing channel of an adjacent member, and welding together such adjacent side walls along a circumferential line where the curvature of such outwardly facing channel section changes to the curvature of such adjacent inwardly facing channel section.

References Cited in the file of this patent

UNITED STATES PATENTS

| Number | Name | Date |
|---|---|---|
| 788,970 | Waterman | Mar. 2, 1905 |
| 809,561 | Greenfield | Jan. 9, 1906 |
| 1,094,323 | Fulton | Apr. 21, 1914 |
| 1,151,777 | Fulton | Aug. 31, 1915 |
| 1,852,921 | Dreyer | Apr. 5, 1932 |
| 2,323,985 | Fausek et al. | July 13, 1943 |
| 2,347,185 | Fentress | Apr. 25, 1944 |

FOREIGN PATENTS

| Number | Country | Date |
|---|---|---|
| 139,164 | Germany | of 1901 |
| 238,623 | Germany | of 1911 |